US010379544B2

(12) United States Patent
Wulff

(10) Patent No.: US 10,379,544 B2
(45) Date of Patent: Aug. 13, 2019

(54) FLIGHT CONTROL SYSTEM FOR A ROTARY WING AIRCRAFT

(71) Applicant: Sikorsky Aircraft Corporation, Stratford, CT (US)

(72) Inventor: Ole Wulff, Ansonia, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 59 days.

(21) Appl. No.: 15/526,038

(22) PCT Filed: Sep. 24, 2015

(86) PCT No.: PCT/US2015/051928
§ 371 (c)(1),
(2) Date: May 11, 2017

(87) PCT Pub. No.: WO2016/085564
PCT Pub. Date: Jun. 2, 2016

(65) Prior Publication Data
US 2017/0315563 A1 Nov. 2, 2017

Related U.S. Application Data

(60) Provisional application No. 62/084,268, filed on Nov. 25, 2014.

(51) Int. Cl.
*G05D 1/08* (2006.01)
*B64C 27/57* (2006.01)
(Continued)

(52) U.S. Cl.
CPC ........... *G05D 1/0858* (2013.01); *B64C 13/16* (2013.01); *B64C 27/10* (2013.01); *B64C 27/57* (2013.01);
(Continued)

(58) Field of Classification Search
None
See application file for complete search history.

(56) References Cited

U.S. PATENT DOCUMENTS 4,304,375 A 12/1981 Builta et al.
7,510,377 B1 * 3/2009 Carter, Jr. ............. B64C 27/024
416/104
(Continued)

FOREIGN PATENT DOCUMENTS

WO 2009025909 A2 2/2009

OTHER PUBLICATIONS

International Search Report and Written Opinion of the International Search Authority dated Mar. 11, 2016 in related PCT Application No. PCT/US2015/051928, 11 pages.
(Continued)

*Primary Examiner* — Jonathan M Dager
*Assistant Examiner* — Garrett F Evans
(74) *Attorney, Agent, or Firm* — Cantor Colburn LLP

(57) ABSTRACT

A rotary wing aircraft includes an airframe including an extending tail. The airframe includes a longitudinal axis that extends through the extending tail. The rotary wing aircraft also includes a main rotor assembly including at least one rotor hub supporting a plurality of rotor blades configured and disposed to rotate about a main rotor axis, at least one elevator arranged at the extending tail, and a control system operably connected to the main rotor assembly and the at least one elevator. The control system is configured and disposed to adjust each of a pitch rate and an attitude of the airframe by selectively adjusting a position of the at least one elevator.

10 Claims, 3 Drawing Sheets

(51) Int. Cl.
*B64C 27/82* (2006.01)
*B64C 13/16* (2006.01)
*B64C 27/10* (2006.01)

(52) U.S. Cl.
CPC ...... *B64C 27/82* (2013.01); *B64C 2027/8236* (2013.01); *B64C 2027/8272* (2013.01); *B64C 2027/8281* (2013.01)

(56) References Cited

U.S. PATENT DOCUMENTS

| | | | |
|---|---|---|---|
| 2009/0159740 A1* | 6/2009 | Brody | B64C 27/10 244/17.21 |
| 2009/0321554 A1* | 12/2009 | Roesch | B64C 27/26 244/6 |
| 2010/0178167 A1* | 7/2010 | Janker | B64C 27/615 416/1 |
| 2011/0057071 A1 | 3/2011 | Sahasrabudhe et al. | |
| 2012/0175461 A1* | 7/2012 | van der Westhuizen | B64C 27/025 244/17.25 |
| 2014/0084105 A1 | 3/2014 | Eglin | |
| 2014/0236399 A1 | 8/2014 | Oudin et al. | |
| 2015/0246725 A1* | 9/2015 | Reilly | B64C 27/605 244/92 |

OTHER PUBLICATIONS

Extended European Search Report for Application No. 1563227.3; dated Jun. 6, 2018; 8 pages.

* cited by examiner

FLIGHT CONTROL SYSTEM FOR A ROTARY WING AIRCRAFT

CROSS-REFERENCE TO RELATED APPLICATIONS

The present application is a 371 National Stage of International Patent Application No. PCT/US2015/051928, filed on Sep. 24, 2015, which claims priority to U.S. Provisional Application No. 62/084,268, filed on Nov. 25, 2014, the contents of which are incorporated herein by reference in their entirety.

STATEMENT OF FEDERAL SUPPORT

This invention was made with Government support under contract number W911W6-13-2-0013 awarded by the United States Army under the AATD TIA. The Government has certain rights in the invention.

BACKGROUND OF THE INVENTION

Exemplary embodiments pertain to the art of rotary wing aircraft and, more particularly, to a flight control system for a rotary wing aircraft.

Rotary wing aircraft rely on a main rotor for pitch and attitude control. More specifically, a pilot manipulates a cyclic to adjust an angle of attack (AOA) of the main rotor to change pitch and/or attitude characteristics of the aircraft. A tail rotor is generally employed to control yaw characteristics. By controlling the AOA of the main rotor and controlling the tail rotor, a pilot may maneuver the rotary wing aircraft.

BRIEF DESCRIPTION OF THE INVENTION

Disclosed is a rotary wing aircraft including an airframe including an extending tail. The airframe includes a longitudinal axis that extends through the extending tail. The rotary wing aircraft also includes a main rotor assembly including at least one rotor hub supporting a plurality of rotor blades configured and disposed to rotate about a main rotor axis, at least one elevator arranged at the extending tail, and a control system operably connected to the main rotor assembly and the at least one elevator. The control system is configured and disposed to adjust each of a pitch rate and an attitude of the airframe by selectively adjusting a position of the at least one elevator.

In addition to one or more of the features described above or below, or as an alternative, further embodiments include wherein the control system includes a moment mixer and a handling quality (HQ) mixer.

In addition to one or more of the features described above or below, or as an alternative, further embodiments include a hub moment sensor operably connected to the main rotor assembly.

In addition to one or more of the features described above or below, or as an alternative, further embodiments include a hub moment estimator operably connected to the control system.

In addition to one or more of the features described above or below, or as an alternative, further embodiments include wherein the control system includes a hub moment feedback system operably connected to the hub moment sensor and the rotor hub and the moment mixer, wherein the control system selectively adjusts rotor hub moment based on an input from the hub moment feedback system.

In addition to one or more of the features described above or below, or as an alternative, further embodiments include an attitude/pitch rate sensor operably connected to the airframe.

In addition to one or more of the features described above or below, or as an alternative, further embodiments include wherein the control system includes a pitch rate and attitude feedback system operably connected to the attitude/pitch rate sensor and each of the moment mixer and the handling quality (HQ) mixer, wherein the control system selectively adjusts a position of the at least one elevator based on an input from the pitch rate and attitude feedback system.

In addition to one or more of the features described above or below, or as an alternative, further embodiments include a translational thrust system including at least one propeller configured to rotate about a thrust axis that is substantially parallel to the longitudinal axis, the control system being configured and disposed to selectively adjust a pitch of the at least one propeller to control forward and rearward motion of the airframe.

In addition to one or more of the features described above or below, or as an alternative, further embodiments include wherein the at least one rotor hub includes a first rotor hub supporting a first plurality of rotor blades and a second rotor hub supporting a second plurality of rotor blades, the main rotor assembly defining a co-axial rotor assembly.

In addition to one or more of the features described above or below, or as an alternative, further embodiments include wherein the at least one elevator includes a first elevator arranged on a starboard side of the longitudinal axis and a second elevator arranged on a port side of the longitudinal axis Also disclosed is a method of controlling a rotary wing aircraft. The method includes selectively adjusting a position of at least one elevator to control at least one of a pitch and an attitude of the rotary wing aircraft.

In addition to one or more of the features described above or below, or as an alternative, further embodiments include sensing a pitch and an attitude with an attitude/pitch rate sensor mounted to an airframe of the rotary wing aircraft, and generating a first feedback signal from the sensed pitch and attitude, the first feedback signal being introduced into a moment mixer to selectively adjust the position of the elevator.

In addition to one or more of the features described above or below, or as an alternative, further embodiments include wherein the first feedback signal represents a fast feedback signal, the fast feedback signal defining a difference between a command model input and an actual position of the airframe to reduce model inaccuracies of the command model input.

In addition to one or more of the features described above or below, or as an alternative, further embodiments include generating a second feedback signal from the sensed pitch and attitude, the second feedback signal being distinct from the first feedback signal and introduced into a handling quality (HQ) mixer to selectively adjust pitch of one or more rotor blades operably coupled to a main rotor assembly, wherein the second feedback signal represents a slow feedback signal, the slow feedback signal adjusting for changes in trim points of the airframe.

In addition to one or more of the features described above or below, or as an alternative, further embodiments include sensing main rotor hub moment through a hub moment sensor, and generating a hub moment feedback signal from the hub moment sensor, the hub moment feedback signal being introduced into the moment mixer to selectively adjust pitch of one or more rotor blades operably coupled to a main rotor assembly.

In addition to one or more of the features described above or below, or as an alternative, further embodiments include configuring the first feedback signal with at least one flight regime parameter.

In addition to one or more of the features described above or below, or as an alternative, further embodiments include driving a main rotor assembly including a first rotor hub supporting a first plurality of rotor blades and a second rotor hub supporting a second plurality of rotor blades.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
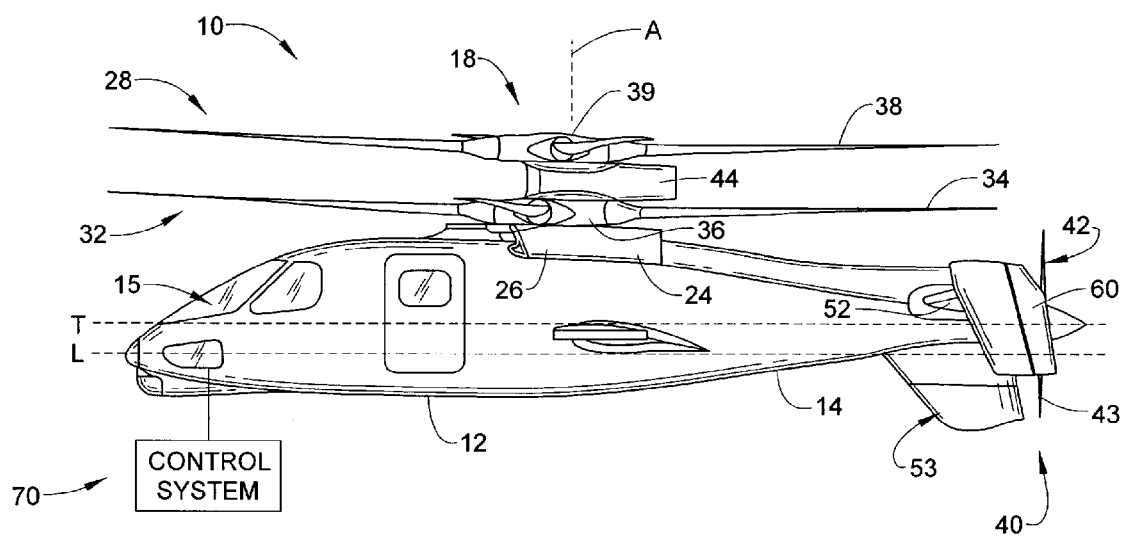
FIG. 1 depicts a rotary wing aircraft, in accordance with an exemplary embodiment.
Figure 2:
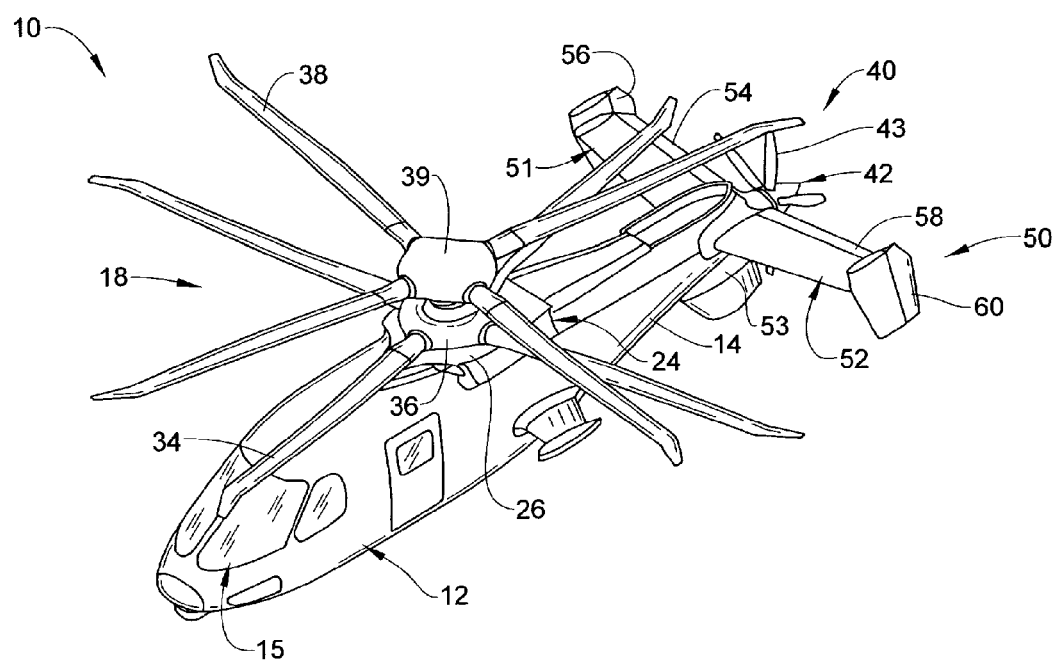
FIG. 2 is a perspective view of a rotary wing aircraft, in accordance with an exemplary embodiment.

FIGS. 1 and 2 depict an exemplary embodiment of a rotary wing, vertical takeoff and land (VTOL) aircraft 10. The aircraft 10 includes an airframe 12 with an extending tail 14. A dual, counter rotating, coaxial main rotor assembly 18 is located at the airframe 12 and rotates about a main rotor axis, A. In an exemplary embodiment, the airframe 12 includes a cockpit 15 having two seats for flight crew (e.g., pilot and co-pilot) and six seats for passengers (not shown). Main rotor assembly 18 is driven by a power source, for example, one or more engines 24 via a gearbox 26. Main rotor assembly 18 includes an upper rotor assembly 28 driven in a first direction (e.g., counter-clockwise) about the main rotor axis, A, and a lower rotor assembly 32 driven in a second direction (e.g., clockwise) about the main rotor axis, A, opposite to the first direction (i.e., counter rotating rotors). Upper rotor assembly 28 includes a first plurality of rotor blades 34 supported by a first rotor hub 36. Lower rotor assembly 32 includes a second plurality of rotor blades 38 supported by a second rotor hub 39. In some embodiments, the aircraft 10 further includes a translational thrust system 40 having a propeller 42 located at the extending tail 14 to provide translational thrust (forward or rearward) for aircraft 10. Propeller 42 includes a plurality of blades 43.

Main rotor assembly 18 includes a rotor hub fairing 44 generally located between and around the upper and lower rotor assemblies 28 and 32 such that rotor hub 36 and rotor hub 39 are at least partially contained therein. Rotor hub fairing 44 provides drag reduction. First plurality of rotor blades 34 is connected to rotor hub 36 in a hingeless manner, also referred to as a rigid rotor system. Similarly, second plurality of rotor blades 38 is connected to rotor hub 39 in a hingeless manner. In accordance with an aspect of the exemplary embodiment, upper and lower rotor assemblies 28 and 32 rotate about a fixed axis. Although a particular aircraft configuration is illustrated in this non-limiting embodiment, other rotary wing aircraft will also benefit from embodiments of the invention. Although, the dual rotor system is depicted as coaxial, embodiments include dual rotor aircraft having non-coaxial rotors.

Propeller 42, or translational thrust system 40, is connected to, and driven by, the engine 24 via the gearbox 26. Translational thrust system 40 may be mounted to the rear of the airframe 12 with a translational thrust axis, T, oriented substantially horizontal and parallel to the aircraft longitudinal axis, L, to provide thrust for high-speed flight. The term "parallel" should be understood to include a translational thrust axis that is coincident with the longitudinal axis. Translational thrust axis, T, corresponds to the axis of rotation of propeller 42. While shown in the context of a pusher-prop configuration, it is understood that the propeller 42 could also be a more conventional puller prop or could be variably facing so as to provide yaw control in addition to, or instead of, translational thrust. It should be understood that any such system or other translational thrust systems may alternatively or additionally be utilized. Alternative translational thrust systems may include different propulsion forms, such as a jet engine.

In accordance with an aspect of an exemplary embodiment, propeller blades 43 of translational thrust system 40 may include a variable pitch. More specifically, the pitch of propeller blades 43 may be altered to change the direction of thrust (e.g., forward or rearward). In accordance with another aspect of an exemplary embodiment, extended tail 14 includes a tail section 50 including starboard and port horizontal stabilizers 51 and 52. Tail section 50 also includes a vertical stabilizer 53 that extends downward from extending tail 14. Starboard horizontal stabilizer 51 includes a starboard active elevator 54 and a starboard active rudder 56. Similarly, port horizontal stabilizer 52 includes a port active elevator 58 and a port active rudder 60. Elevators 54 and 58 and rudders 56 and 60 act as controllable surfaces, e.g., surfaces that alter a flight path/characteristics of aircraft 10.

Figure 3:
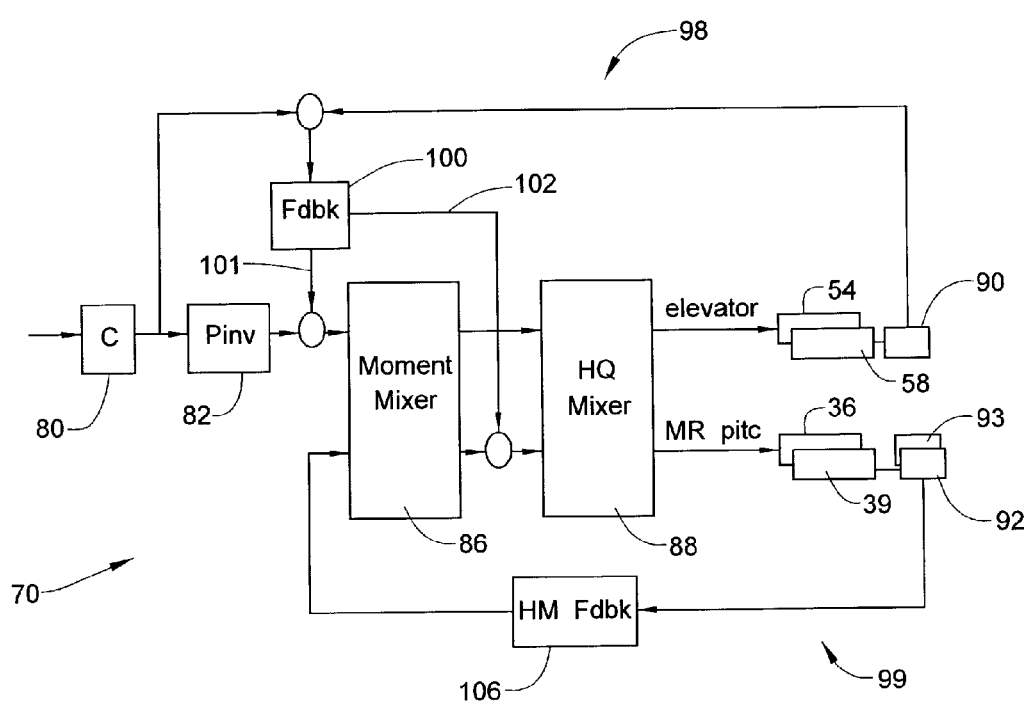
FIG. 3 is a schematic diagram illustrating a control system of the rotary wing aircraft, in accordance with an exemplary embodiment.

Referring to FIG. 3, in accordance with an exemplary embodiment, aircraft 10 includes a control system 70 which, as will be detailed more fully below, adjusts attitude and pitch of airframe 12 by selectively manipulating/adjusting elevators 54 and 58. Control system 70 includes a command model module 80 that is operatively connected to one or more control members (not shown) arranged in cockpit 15. The pilot and/or co-pilot manipulate the one or more control members to adjust flight characteristics of aircraft 10. Command model module 80 is operably connected to an inverse plant module 82 which outputs an inverse control signal. Inverse plant module 82 is operably connected to a moment mixer 86 which controls hub moment. Moment mixer 86 is operably connected to a handling quality (HQ) mixer 88 which controls handling characteristics of aircraft 10. HQ mixer 88 is operably connected to elevators 54 and 58 and rotor hubs 36 and 39. Control system 70 also includes an attitude/pitch rate sensor 90 and a hub moment sensor 92. Hub moment sensor 92 may take the form of a hub moment estimator 93. The particular location of attitude/pitch rate sensor 90 and hub moment sensor 92 and/or hub moment estimator 93 may vary. Hub moment estimator 93 may provide an estimate of hub moment thereby eliminating the need to sense actual hub moment.

In further accordance with an exemplary embodiment, control system 70 includes a first or pitch/attitude feedback system 98 and a second or hub moment feedback system 99. First feedback system 98 includes a first feedback module 100 operably connected to command model module 80, moment mixer 86, HQ mixer 88 and attitude/pitch rate sensor 90. First feedback module 100 outputs a first or fast feedback signal 101 to moment mixer 86 and a second or slow feedback signal 102 to HQ mixer 88. First or fast feedback signal 101 represents a difference between actual aircraft attitude/pitch rate as sensed by attitude/pitch rate sensor 90 and a model attitude/pitch rate response provided by command model module 80.

First feedback signal 101 is combined with the inverse control signal and passed to moment mixer 86 and HQ mixer 88. Moment mixer 86 and HQ mixer 88 employ first feedback signal 101 and the inverse control signal to establish a desired position of elevators 54 and 58 to control attitude and pitch rate. That is, in contrast to existing rotary wing aircraft which rely on manipulating a position of the main rotor, attitude and pitch rate of aircraft 10 is adjusted through the manipulation of elevators 54 and 58. First feedback signal 101 allows control system 70 to further control elevators 54 and 58 to adjust flight characteristics of aircraft 10 to provide desired stability, and provide disturbance rejection, e.g., account for wind gusts and other anomalies that may alter flight characteristics. More specifically, command model module 80 provides a desired position output for elevators 54 and 58. However, command model module 80 does not, itself, adjust for various anomalies that may affect aircraft 10. Second feedback signal 102 is passed to HQ mixer 88 to establish hub moment trim point control of aircraft 10. In addition, moment mixer 86 may receive a flight regime parameter (FRP) such as airspeed, aircraft weight, air density, air temperature altitude, and the like. The FRP may also be employed to configure HQ mixer 88 as well as enhance feedback quality from pitch/attitude feedback system 98 and a second or hub moment feedback system 99. Second feedback system 99 includes a second feedback module 106 that is connected between hub moment sensor 92 and moment mixer 86. Second feedback system 99 provides an actual hub moment signal to moment mixer 86. Moment mixer 86 selectively generates an output signal to reduce rotor hub moment excursions based on the actual hub moment. In this manner, control system 70 decouples hub moment control and elevator control to reduce hub moment while maintaining desirable flight characteristics of aircraft 10.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A rotary wing aircraft comprising:
   an airframe including an extending tail, the airframe including a longitudinal axis that extends through the extending tail;
   a main rotor assembly including at least one rotor hub supporting a plurality of rotor blades configured and disposed to rotate about a main rotor axis;
   at least one elevator arranged at the extending tail; and
   a control system operably connected to the main rotor assembly and the at least one elevator, the control system including a hub moment estimator operatively connected to the at least one rotor hub, a hub moment sensor operatively connected to one of the at least one rotor hub and the hub moment estimator, an attitude/pitch rate sensor operatively connected to the airframe, and a hub moment mixer operable to control hub moment, the control system being configured and disposed to adjust each of a pitch rate and an attitude of the airframe by selectively adjusting a position of the at least one elevator, the control system further including
   a hub moment feedback system operatively connected to one of the hub moment sensor and the hub moment estimator, and the rotor hub and the moment mixer, wherein the control system selectively adjusts rotor hub moment based on an input from the hub moment feedback system; and
   a pitch rate and attitude feedback system operatively connected to the attitude/pitch rate sensor and the moment mixer, wherein the control system selectively adjusts a position of the at least one elevator based on an input from the pitch rate and attitude feedback system.

2. The rotary wing aircraft according to claim 1, wherein the control system includes a handling quality (HQ) mixer.

3. The rotary wing aircraft according to claim 1, further comprising: a translational thrust system including at least one propeller configured to rotate about a thrust axis that is substantially parallel to the longitudinal axis, the control system being configured and disposed to selectively adjust a pitch of the at least one propeller to control forward and rearward motion of the airframe.

4. The rotary wing aircraft according to claim 1, wherein the at least one rotor hub includes a first rotor hub supporting a first plurality of rotor blades and a second rotor hub supporting a second plurality of rotor blades, the main rotor assembly defining a co-axial rotor assembly.

5. The rotary wing aircraft according to claim 1, wherein the at least one elevator includes a first elevator arranged on a starboard side of the longitudinal axis and a second elevator arranged on a port side of the longitudinal axis.

6. A method of controlling a rotary wing aircraft comprising:
   selectively adjusting a position of at least one elevator to control at least one of a pitch and an attitude of the rotary wing aircraft;
   sensing a pitch and an attitude with an attitude/pitch rate sensor mounted to an airframe of the rotary wing aircraft;
   generating a pitch and attitude feedback signal from the sensed pitch and attitude, the pitch and attitude feedback signal being introduced into a moment mixer to selectively adjust the position of the elevator:
   determining main rotor hub moment through one of a hub moment sensor and a hub moment estimator; and
   generating a hub moment feedback signal from the one of the hub moment sensor and the hub moment estimator, the hub moment feedback signal being introduced into the moment mixer to selectively adjust pitch of one or more rotor blades operably coupled to a main rotor assembly.

7. The method of claim 6, wherein the pitch and attitude feedback signal represents a fast feedback signal, the fast feedback signal defining a difference between a command model input and an actual position of the airframe to reduce model inaccuracies of the command model input.

8. The method of claim 6, further comprising: generating another feedback signal from the sensed pitch and attitude, the another feedback signal being distinct from the pitch and attitude feedback signal and introduced into a handling quality (HQ) mixer to selectively adjust pitch of one or more rotor blades operably coupled to a main rotor assembly, wherein the another feedback signal represents a slow feedback signal, the slow feedback signal adjusting for changes in trim points of the airframe.

9. The method of claim 6, further comprising: configuring the pitch and attitude feedback signal with at least one flight regime parameter (FRP).

10. The method of claim 6, further comprising: driving a main rotor assembly including a first rotor hub supporting a first plurality of rotor blades and a second rotor hub supporting a second plurality of rotor blades.

\* \* \* \* \*